US008649614B2

(12) United States Patent
Hondo et al.

(10) Patent No.: US 8,649,614 B2
(45) Date of Patent: Feb. 11, 2014

(54) METHOD OF COMPILING IMAGE DATABASE, IMAGE DATABASE COMPILATION PROGRAM, IMAGE RETRIEVAL METHOD

(75) Inventors: Takayuki Hondo, Sakai (JP); Koichi Kise, Sakai (JP); Yukihito Furuhashi, Hachioji (JP); Taiji Mine, Chofu (JP)

(73) Assignees: Osaka Prefecture University Public Corporation, Osaka (JP); Olympus Corporation, Tokyo (JP)

( * ) Notice: Subject to any disclaimer, the term of this patent is extended or adjusted under 35 U.S.C. 154(b) by 238 days.

(21) Appl. No.: 13/254,347

(22) PCT Filed: Mar. 3, 2010

(86) PCT No.: PCT/JP2010/053448
§ 371 (c)(1),
(2), (4) Date: Sep. 1, 2011

(87) PCT Pub. No.: WO2010/101187
PCT Pub. Date: Sep. 10, 2010

(65) Prior Publication Data
US 2011/0317923 A1  Dec. 29, 2011

(30) Foreign Application Priority Data
Mar. 4, 2009  (JP) .................................. 2009-050637

(51) Int. Cl.
*G06K 9/62* (2006.01)
*G06K 9/46* (2006.01)
*G06K 9/54* (2006.01)

(52) U.S. Cl.
USPC ............................ 382/225; 382/195; 382/305

(58) Field of Classification Search
None
See application file for complete search history.

(56) References Cited

U.S. PATENT DOCUMENTS 6,100,901 A *  8/2000  Mohda et al. ................. 345/440
2005/0105779 A1  5/2005  Kamei (Continued)

FOREIGN PATENT DOCUMENTS

CN  1613090 A   5/2005
CN  101308567 A  11/2008

OTHER PUBLICATIONS

Shih et al, "A Context-Based Approach for Color Image Retrieval," 2002, International Journal of Pattern Recognition and Articial Intelligence, vol. 16, No. 2, pp. 239-255.*

(Continued)

Primary Examiner — Barry Drennan
Assistant Examiner — David F Dunphy
(74) Attorney, Agent, or Firm — Renner, Otto, Boisselle & Sklar, LLP

(57) ABSTRACT

A method for creating an image database comprising an extraction step of extracting reference feature vectors from a reference image which should be compared with a retrieval query image for object recognition, the reference feature vectors corresponding to local features at different positions of the reference image and representing the position and characteristics of each of the local features as a vector position, vector length, and a vector direction, a clustering step of creating a plurality of clusters consisting of different reference feature vectors in such a manner that each reference vector belongs to any of the plurality of clusters, a selection step of selecting the representative vector of the clusters from among the reference feature vectors of each of the clusters, and a step of associating the representative vector with the reference image and registering the representative vector associated therewith in the image database for the object recognition, wherein, in the clustering step, each of the clusters is created in such a manner that reference feature vectors at a near vector position belong to the same cluster, and in the selection step, reference feature vectors with long vector length are given priority to select the representative vector, and wherein the retrieval query image and the reference image are compared with each other by generating at least one query feature vector from the retrieval query image, and applying local search between the query feature vector and the representative vector, each of the steps being executed by computers.

6 Claims, 4 Drawing Sheets

(56) References Cited

U.S. PATENT DOCUMENTS

2006/0120411 A1* 6/2006 Basu et al. .................. 370/539
2007/0244915 A1* 10/2007 Cha et al. .................... 707/101

OTHER PUBLICATIONS

Begum et al, "An Efficient Algorithm for Codebook Design in Transform Vector Quantization," IVSCG 2003, Pizen, Czech Republic, pp. 1-4.*
International Search Report for corresponding International Application No. PCT/JP2010/053448 mailed May 11, 2010.
D. G. Lowe, "Distinctive Image Features from Scale-Invariant Keypoints", Internal Journal of Computer Vision, 60, 2, pp. 91-110, 2004.
Ye et al., "PCA-SIFT: A More Distinctive Representation for Local Image Descriptors", Proc. CVPR' 04, vol. 2, pp. 506-513, 2004.
Noguchi et al., "Experimental Study of Memory Reduction for Object Recognition Based on Local Descriptors", Collection of Papers in Meeting on Image Recognition and Understanding (MIRU 2008), OS 10-3, pp. 251-258, 2008.
Nistér et al., "Scalable Recognition with a Vocabulary Tree", Proc. CVPR 2006, pp. 775-781, 2006.
Arya et al., "An Optimal Algorithm for Approximate Nearest Neighbor Searching in Fixed Dimensions", Journal of the ACM, vol. 45, No. 6, pp. 891-923, 1998.
Joutou et al., "Bag-of-Keypoints Hyogen o Mochiita Web Gazo Bunrui", Information Processing Society of Japan Kenkyu Hokoku, May 15, 2007, vol. 2007, No. 42, pp. 201-208, 4. Gazo Ninshiki Hoho.

* cited by examiner (a) SHOOTING ANGLE 90°

(c) SHOOTING ANGLE 60°

(b) SHOOTING ANGLE 75°

(d) PARTIAL SHOOTING RANGE

METHOD OF COMPILING IMAGE DATABASE, IMAGE DATABASE COMPILATION PROGRAM, IMAGE RETRIEVAL METHOD

TECHNICAL FIELD

The present invention relates to a method of compiling an image database, an image database compilation program, and an image retrieval method. More specifically, the present invention relates to a method of compiling an image database used for specific object recognition using local features, a program for causing a computer to execute the method of compilation, and an image retrieval method using the image database.

BACKGROUND ART

Specific object recognition is processing of determining which, among objects in other images, an object taken as an image is identical to. As used herein, this processing is also referred to as image recognition. For example, such processing can be used for detection of excess or deficiency of parts, detection of counterfeits or the like, or substitute for bar-code processing, thus having a high utility. Here, "an object taken as an image" means an instance (retrieval target) included in the image as a query, and "processing of determining which, among objects in other images, an object taken as an image is identical to" is also understood as processing of retrieving an image including an identical instance from an image database in which multiple images have been registered in advance, that is, processing of image retrieval.

A method using local features is known as one of methods of the specific object recognition. In the method using local features, an image is represented by local features extracted from the image through a predetermined procedure, and the local features are compared or matched with local features extracted from another image, whereby identification (recognition) is performed. For example, local features are used in SIFT (Scale-Invariant Feature Transform) (for example, see Non-Patent Literature 1) and PCA-SIFT (Principal Component Analysis-SIFT) (for example, see Non-Patent Literature 2). Such a local feature is represented as a multidimensional vector, and therefore, is also referred to as a feature vector. The above methods have a merit that recognition with a high accuracy can be performed even when there is some occlusion or variation in an instance included in a query image and/or an instance included in an image registered in an image database, because multiple feature vectors are extracted based on local characteristics of an image.

Other literatures relevant to the present invention include Non-Patent Literatures 3, 4, and 5. Specific relevancy between the present invention and each of the literatures will be described later.

CITATION LIST

Non-Patent Literature

Non-Patent Literature 1: D. G. Lowe, "Distinctive image features from scale-invariant keypoints", Internal Journal of Computer Vision, 60, 2, pp. 91-110, 2004.

Non-Patent Literature 2: Y. Ke, and R. Sukthankar, "PCA-SIFT: A more distinctive representation for local image descriptors", Proc. CVPR' 04, vol. 2, pp. 506-513, 2004.

Non-Patent Literature 3: Noguchi, Kise, and Iwamura: "Experimental Study of Memory Reduction for Object Recognition based on Local Descriptors", Collection of papers in Meeting on image recognition and understanding (MIRU 2008), OS 10-3, pp. 251-258, 2008.

Non-Patent Literature 4: D. Nister and H. Stewenius, "Scalable Recognition with a Vocabulary Tree", Proc. CVPR 2006, pp. 775-781, 2006.

Non-Patent Literature 5: S. Arya, D. Mount, R. Silverman and A. Y. Wu, "An optimal algorithm for approximate nearest neighbor searching", Journal of the ACM, vol. 45, no. 6, pp. 891-923, 1998.

SUMMARY OF THE INVENTION

Disclosure of the Invention

The number of local features extracted from one image is, if the image has a size of VGA, normally, about several thousand, or it can sometimes be several tens of thousand. Therefore, in the case where the sizes or the number of images to be recognized are large, processing time needed for comparing local features of the images, and a memory amount needed for storing the local features become problems.

In order to solve the above problems, an approach that a memory amount needed for storing each local feature is reduced has been proposed (see Non-Patent Literature 3). Specifically, scalar quantization which reduces the bit number of multivalued data representing the values of the dimensions of each feature vector, is performed to reduce a memory amount needed for registering each local feature into an image database, whereby a memory amount needed for the entirety of the image database is reduced. This method has a merit that scalar quantization can be performed in a relatively easy manner by investigating the distribution of the values of the dimensions of each feature vector in advance. Meanwhile, a concept of vector quantization has been also proposed. D. Nister, et al., have proposed a method using a tree structure called Vocabulary Tree, as one of methods of vector quantization (for example, see Non-Patent Literature 4). However, in this method, the height of the tree structure needs to be increased to maintain a high recognition rate. Therefore, there is a problem that a sufficient effect of reducing a memory amount cannot be expected.

The present invention has been made in light of the above context, and provides a method for, in a method of performing object recognition by means of near neighbor search using local features extracted from an image, reducing a memory amount needed for an image database used in the object recognition, without largely decreasing the recognition rate of the object recognition; and a program for causing a computer to execute the method. In addition, the present invention provides a method for retrieving an image using an image database compiled based on the above method.

Solution to the Problems

The present invention provides a method of compiling an image database storing reference images to be compared with a query image and being used for object recognition, the method comprising: an extracting step of extracting a plurality of reference feature vectors representing local features of different locations from a reference image to be stored into the image database, each reference feature vector having a vector length and a vector direction; a clustering step of forming clusters, each cluster being composed of different feature vectors; a selecting step of selecting a feature vector from each cluster as a representative vector of each cluster; and a storing step of storing the representative vector into the image data base in relation with the reference image, wherein:

the clustering step forms each cluster so that the reference feature vectors representing local features locating closely on the reference image belong to the same cluster; the selecting step gives a priority to any of the reference feature vectors each having a long vector length to select the representative vector; the comparison is made by generating at least one query feature vector from the query image in the same manner as that of extracting the reference feature vector and adopting a near neighbor search between the query feature vector and the representative vector; and each of the above steps is executed by a computer.

In another aspect, the present invention provides an image database compilation program for causing a computer to execute a compilation of an image database storing reference images to be made comparison with an query image and being used for object recognition, the program comprising: an extracting step of extracting a plurality of reference feature vectors representing local features of different locations from a reference image to be stored into the image database, each reference feature vector having a vector length and a vector direction; a clustering step of forming clusters, each cluster being composed of different feature vectors; a selecting step of selecting a feature vector from each cluster as representative vector of each cluster; and a storing step of storing the representative vector into the image data base in relation with the reference image, wherein: the clustering step forms each cluster so that the reference feature vectors representing local features locating closely on the reference image belong to the same cluster; the selecting step gives a priority to any of the reference feature vectors each having a long vector length to select the representative vector; and the comparison is made by generating at least one query feature vector from the query image in the same manner as that of extracting the reference feature vector and adopting a near neighbor search between the query feature vector and the representative vector.

In addition, the present invention provides, as a method associated with the above method of compiling the image database, an image retrieval method of retrieving from an image database storing previously a plurality of reference images to be compared with a query image and being used for an image retrieval, each reference image being stored in conjunction with representative vectors extracted from each reference image, a particular reference image corresponding to the query image, the method comprising: an extracting step of extracting at least one query feature vector representing local feature of the query image and having a vector length and a vector direction; a comparing step of making comparison between the query feature vector and the representative vectors related to each reference image adopting a near neighbor search therebetween, wherein: the representative vectors are obtained through a procedure of extracting a plurality of reference feature vectors from each reference image in the same manner as that of extracting the query feature vector; forming clusters, each cluster being composed of the reference feature vectors, so that the reference feature vectors representing local features locating closely on each reference image belong to the same cluster; selecting the representative vector from each cluster giving a priority to any of the reference feature vectors having a long vector length to select the representative vector; and each of the above steps is executed by a computer.

It is noted that a procedure of generating a query feature vector from the query image is the same as the procedure of extracting a feature vector.

Effects of the Invention

In the method of compiling an image database according to the present invention, each cluster is formed so that the reference feature vectors representing local features locating closely on the reference image belong to the same cluster; a priority is given to any of the reference feature vectors each having a long vector length to select a predetermined number of representative vectors from each cluster; and the comparison is made between the representative vectors and the query feature vector. Therefore, it is possible to save a memory amount needed for registering feature vectors into the image database, in comparison with the case where such selection of representative vectors is not performed. In addition, representative vectors selected from the respective clusters are registered, that is, the registration is performed in a substantially uniform manner over the entire area of an image without taking feature vectors only from partial areas of the image. Therefore, even when instances are unevenly included in an image or an image was taken being subject to distortion due to geometrical conversion, it is possible to perform robust recognition.

The program for compiling an image database according to the present invention has the same merit as the above method for compiling an image database.

BRIEF DESCRIPTION OF THE DRAWINGS

FIG. 2(a) shows examples of images collected by using Google image search. FIG. 2(b) shows examples of images published on a Web site of PCA-SIFT. FIG. 2(c) shows examples of images collected on "flick" which is a photograph sharing site.

FIGS. 3(a), 3(b), and 3(c) show images obtained by shooting pictures of an instance at shooting angles of 90°, 75°, and 60°, respectively. FIG. 3(d) shows an example of an image obtained by shooting a part of a picture of the instance.

DESCRIPTION OF EMBODIMENTS

Figure 1:
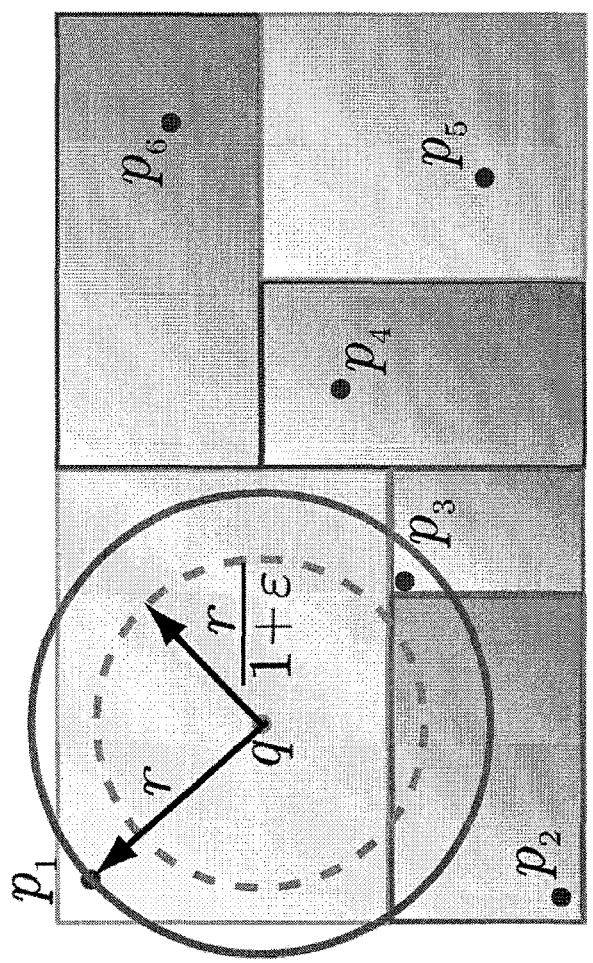
FIG. 1 is a diagram for explaining the concept of ANN which is a known method of approximate nearest neighbor search. The ANN is employed as a method of approximate nearest neighbor search in an embodiment of the present invention.

Hereinafter, preferred embodiments of the present invention will be described.

The clustering step may form a predetermined number of clusters. Even when instances are unevenly distributed in an image or an image was taken being subject to distortion due to geometrical conversion, if the representative vectors are distributed in a substantially uniform manner over the entire area of the image, it is possible to perform robust recognition. The larger the number of clusters to be generated is, the more uniformly the representative vectors are distributed. If the number of clusters that allows sufficiently robust recognition is determined in advance, for example, by experiment, and if the clustering step forms the determined number of clusters, it is possible to perform sufficiently robust recognition.

In addition, the selecting step may determine a sole representative vector from each cluster.

In addition, the clustering step may form the clusters using k-means clustering. Thus, it is possible to cluster feature vectors by k-means clustering such that the representative vectors are evenly distributed over the entire area of the image.

The preferred modes described above may be combined with each other.

Hereinafter, the present invention will be further described in detail with reference to the drawings. It is noted that the following description is in all aspects illustrative. It should not be understood that the following description limits the present invention.

A characteristic aspect of the present invention is to consider reduction of a memory amount for an image database used in image recognition from a viewpoint of sifting selection of local features, and to provide a method for achieving the reduction. More specifically, sifting selection of local features is performed in consideration of the vector lengths (scales) of feature vectors and the uniformity of distribution of the feature vectors in an image space.

According to the following embodiments and experiments, a recognition rate of 98% was obtained even in the case of using an image database for which a memory amount is reduced to about 10% of a memory amount for an image database used in the case where sifting selection of local features is not performed. In this way, the effectiveness of the present invention was verified.

Here, a conventional memory amount reduction method using scalar quantization and the corresponding image recognition processing, performed in specific object recognition, will be once described, before the description of a method for reducing a memory amount according to the present invention. The conventional memory amount reduction method using scalar quantization reduces a memory amount for an image database by an approach different from the method of the present invention. The conventional memory amount reduction method may be combined with the method of the present invention, and it is effective to combine them.

<<Memory Amount Reduction Method using Scalar Quantization>>

Non-Patent Literature 3 proposes an approach using scalar quantization to reduce a memory amount needed in specific object recognition. In this approach, values that each dimension of a feature vector representing each local feature can take are limited to discrete values, whereby reduction of the memory amount is realized. That is, the value of each dimension is limited to a value having a predetermined bit length. Although the number of local features registered in an image database does not vary, a memory amount needed for storing each local feature is decreased. Therefore, the whole memory amount needed for the image database is reduced.

<Extraction of Feature Vectors>

In the present embodiment, local features (feature vectors) are extracted from a reference image and a query image by using PCA-SIFT.

Non-Patent Literature 3 states that even if each dimension of a feature vector obtained by using PCA-SIFT is represented by 2 bits, the recognition rate in image recognition hardly varies. The value of each dimension of a feature vector extracted by using PCA-SIFT is, if the value is represented as a short-type integer, represented by 16 bits. Therefore, if each dimension of a feature vector is reduced to 2 bits through scalar quantization, a memory amount needed for one feature vector becomes about ⅛ of the original memory amount. Although a memory amount for an image database also includes memory amounts needed besides the memory amount for storing each feature vector, Non-Patent Literature 3 states that, even in consideration of such memory amounts, it is possible to reduce the memory amount for the image database to about ⅓ of the original memory amount.

<Comparison between Query Feature Vector and Reference Feature Vector>

Image retrieval is performed by a query feature vector and a reference feature vector being compared with each other. In the comparing processing, the distance between each query feature vector extracted from a query image, and each reference feature vector registered in an image database is calculated, and a reference feature vector that is a near neighbor of the query feature vector is determined. Then, an image ID associated with the determined reference feature vector is obtained.

<Determination of Reference Image as Recognition Result>

Processing of determining a result of image recognition, based on the result of the comparison, is performed. In this processing, votes are given to the image IDs obtained in the comparing processing, to which the query feature vectors correspond, and then a reference image indicated by an image ID that has obtained the most votes is determined as a recognition result.

The accuracy of the distance calculation is deteriorated as a result of the scalar quantization. One of reasons why the recognition rate hardly varies in spite of the deterioration is that erroneous image IDs are removed in accordance with rule of majority in the voting.

<<Memory Amount Reduction Method by Sifting Selection of Local Features>>

The inventors focused on sifting selection of feature vectors as a method for reducing a memory amount for an image database by an approach different from the above-described method using scalar quantization.

<Guideline for Sifting Selection>

Also in a method for reducing a memory amount by sifting selection of reference local features, local features are extracted by using PCA-SIFT.

The number of local features extracted from a reference image differs depending on the content of the reference image. In the case of using an image database that is in a no-reduction state, for which sifting selection of local features is not performed, all local features extracted from an image are registered into the image database. Therefore, the number of local features to be registered largely differs among reference images. If a reference image includes a large number of local features, a large number of similar local features are sometimes extracted from a specific part of the reference image. It is not necessary to register all the similar local features into an image database. This is because such similar local features will not greatly contribute to improvement in the recognition rate owing to the similarity. Therefore, the maximum number of local features to be registered into an image database per one image is restricted to R, so that a memory amount needed for storing reference feature vectors will be prevented from increasing. If the number of extracted reference feature vectors does not exceed R, all the extracted local features are registered into an image database. If the number of extracted reference feature vectors exceeds R, local features to be registered are selected based on the following idea.

<Clustering>

In the present invention, feature vectors having long vector lengths, which have a relatively robust resistance to variation in a shooting angle, are preferentially selected and registered into an image database. The probability that the entirety of a retrieval target is included in a reference image that is to be a recognition result, and in the corresponding query image, is not low. However, if feature vectors having long vector lengths are mostly included in partial areas of a reference image or a query image, feature vectors included in the area other than the partial areas become noise, and as a result, it becomes difficult to retrieve a reference image corresponding to a query image. In order to cope with such uneven presence in a retrieval target image, k-means clustering with a maximum clustering number of R is performed for coordinate values indicating the positions of reference feature vectors in a reference image from which the reference feature vectors have been extracted.

<Selection of Representative Vector and Registration into Image Database>

Next, a reference feature vector having the longest vector length is preferentially selected from among reference feature vectors included in each cluster obtained by k-means clustering. The selected feature vector is registered into an image database. That is, only a representative vector which represents each cluster is registered into an image database.

Through the above procedure, reference feature vectors are selected in a substantially uniform manner from a reference image, without unevenly selecting reference feature vectors. Therefore, even if only a part of an object to be retrieved is included in a reference image, the probability that the object will be recognized can be increased.

<Method of Approximate Nearest Neighbor Search used in Comparison>

ANN (Approximate Nearest Neighbor) (for example, see Non-Patent Literature 5) can be used for comparison between a query feature vector and a reference feature vector (or a representative vector). ANN is a method of performing approximate nearest neighbor search at a high speed by using a tree structure. Although the accuracy of vector comparison decreases owing to approximation, the processing time taken for retrieval can be reduced.

FIG. 1 shows the concept of approximate nearest neighbor search according to the ANN. It is noted that only cells that are engaged in explanation are shown for the purpose of simplification. Reference feature vectors are registered in an image database such that the reference feature vectors are divided into several cells and form a tree structure. Here, q represents a query feature vector of a query image, and $p_1$ to $p_6$ represent reference feature vectors. In addition, it will be assumed that $p_1$ has been discovered as a near neighbor vector at present. r is the distance between the query feature vector q and the reference feature vector $p_1$. In the case of executing nearest neighbor search, cells overlapped by a hypersphere indicated by a solid line are targets of retrieval because there is a possibility that a reference feature vector that is a nearer neighbor vector than $p_1$, that is, a reference feature vector whose distance to q is smaller than r is present in the cells. On the other hand, in the case of executing approximate nearest neighbor search, a hypersphere defined by applying a tolerance error ϵ to the distance r which is a distance to $p_1$ is set, and only cells overlapped by the set hypersphere are targets of retrieval.

$$r/(1+\epsilon) \qquad \text{[Expression 1]}$$

In this case, although there is a possibility that a reference feature vector that is the nearest neighbor ($p_3$ in FIG. 1) cannot be discovered, the number of cells to be retrieved decreases, whereby the retrieval time can be reduced.

In the method of the present invention, there is a possibility that a reference feature vector that is the nearest neighbor (reference feature vector that is to be an answer) corresponding to a query feature vector is not present, because of reduction of local features. Therefore, only when the distance d between a query feature vector and a reference feature vector associated with each other as a result of the comparison by ANN is smaller than a predetermined threshold value t, a vote is given to the corresponding image.

<<Experiments>>

<Reference Image and Image Database>

Experiments for verifying the effectiveness of the sift selection of local features were conducted. An image database in which 100,000 reference images were registered was used in the experiments. The image database of 100,000 reference images included three data sets A, B, and C. The data set A included 3,100 images collected by using Google image search. Search keywords used in collection of the images included "Poster", "magazine", "cover", and the like. The data set B included 18,500 images published on a site of PCA-SIFT. The data set C included 78,400 images collected on "flickr" which is a photograph sharing site by using tags of "animal", "birthday", "food", "japan", and the like. The data set C mainly included photographs of an object, nature, a person, and the like.

Figure 2:
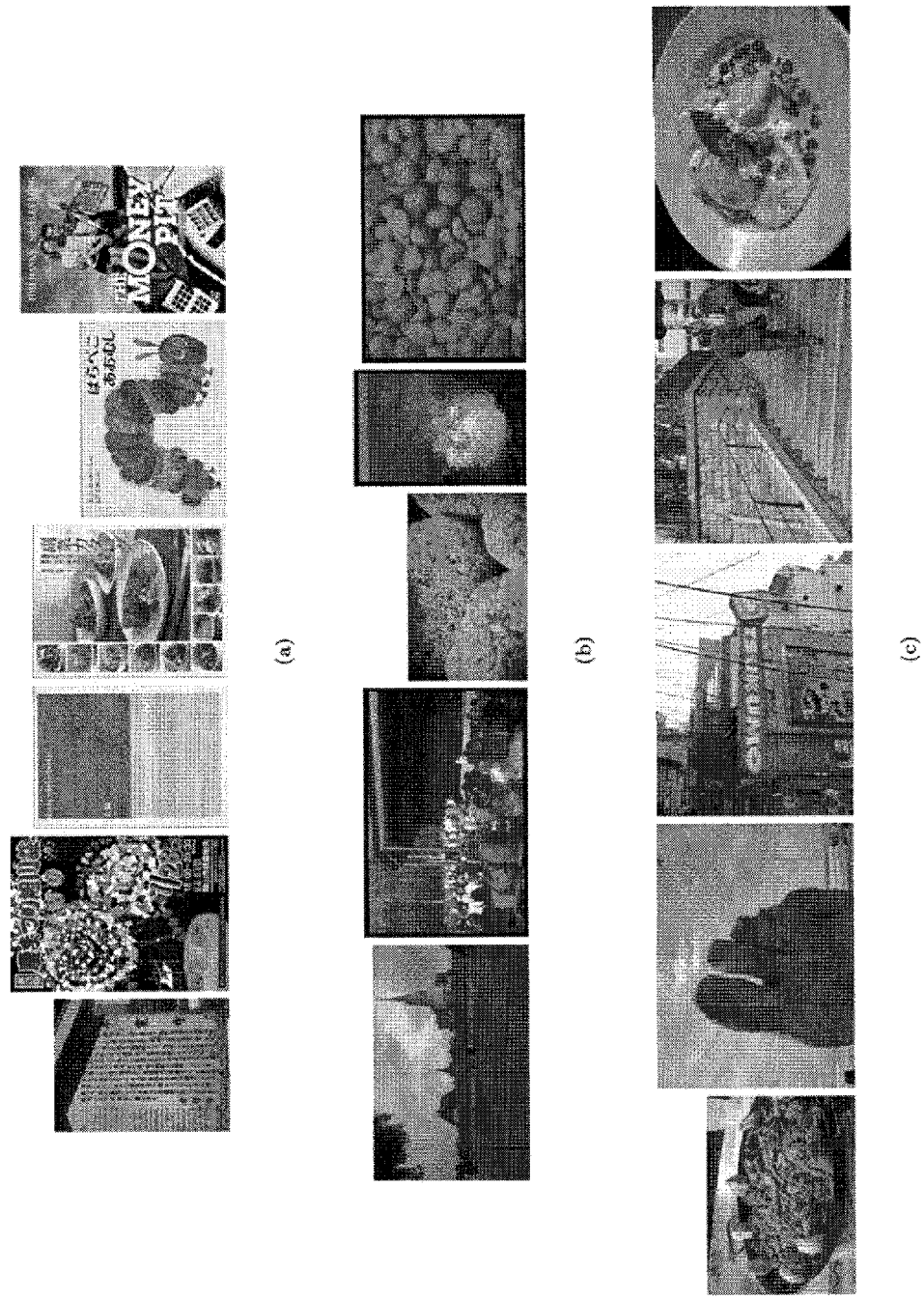
FIGS. 2(a) to 2(c) show examples of images registered in an image database in experiments of the present invention.

FIG. 2 shows examples of the reference images collected through the above procedure.

It is noted that, in collecting reference images, images having sizes equal to or smaller than 600×600 pixels were excluded, and the sizes of reference images were reduced such that the longitudinal sides of the reference images were equal to or smaller than 640 pixels. The sizes of the reference images were almost equal to a VGA size.

Then, local features were extracted from the reference images by using PCA-SIFT (PCA-SIFT provided on http://www.cs.cmu.edu/yke/pcasift/ was used). The total number of the extracted local features was $1.82 \times 10^8$. The total number of local features extracted from a database of 10,000 reference images, which is a sub set of the above image database, was $2.07 \times 10^7$.

Then, for the purpose of comparison, a conventional memory amount reduction method using vector quantization according to Non-Patent Literature 4, and a memory amount reduction method using the sifting selection of local features according to the present invention were each applied to the image databases, whereby a total of four image databases were compiled.

<Memory Reduction Method using Vector Quantization>

Here, a conventional memory amount reduction method using vector quantization will be briefly described.

In vector quantization, feature vectors distributed in a certain area in a feature space are grouped. Therefore, it is necessary to define some method for grouping feature vectors. In the present specification, feature vectors are grouped as follows. First, a feature space is divided by using a standard kd-tree splitting rule which is used for generating a kd-tree. In this method, a dimension indicating the largest variance in a feature space is selected, and the feature space is divided at the median value of coordinates of points distributed on the selected dimension. The maximum number (bucket size) b of feature vectors to be included in each divided feature space is set. The feature space is divided until the number of feature vectors included in each divided feature space is equal to or smaller than b. Then, the center of gravity of the feature vectors distributed in each divided feature space is calculated, and the feature vectors in the divided feature space is replaced by a center-of-gravity vector. The center-of-gravity vectors are registered into a database, and image IDs attached to the feature vectors that have been replaced are attached to the respective center-of-gravity vectors, whereby vector quantization is performed.

The center-of-gravity vectors correspond to codewords in vector quantization, and are often called visual words.

<Experiment Parameters>

The values of a parameter b used for compiling an image database by the method using vector quantization are 1, 2, 3, 5, 10, and 20.

On the other hand, the values of a parameter R used for compiling an image database by the memory amount reduction method using sifting selection of local features are 300, 200, 100, 75, and 50. Table 1 shows the numbers, of local features registered in the image database of 100,000 reference images, that correspond to the respective values of R.

TABLE 1

Number of local features registered in database (sifting selection)

| R | Number of local features | No-reduction ratio [%] |
|---|---|---|
| 50 | $4.99 \times 10^6$ | 2.7 |
| 75 | $7.49 \times 10^6$ | 4.1 |
| 100 | $9.98 \times 10^6$ | 5.5 |
| 200 | $1.98 \times 10^7$ | 10.9 |
| 300 | $2.94 \times 10^7$ | 16.1 |

<Query Image>

100 reference images, 200 reference images, and 200 reference images, i.e., 500 images in total, were selected in a random manner from the data sets A, B, and C, respectively, to obtain retrieval targets. Therefore, reference images to be recognized as the retrieval targets were necessarily included in the image database. Next, these retrieval targets were printed on sheets of A4 paper, and the resultant sheets were shot by a camera.

Figure 3:
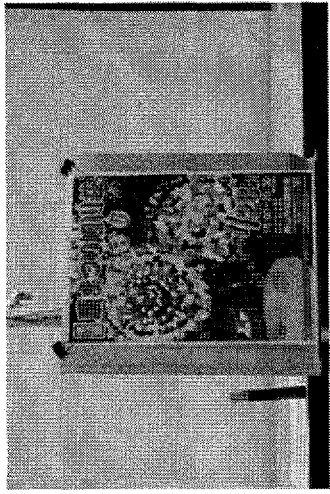
FIGS. 3(a) to 3(d) show examples of images used as query images in the experiments of the present invention.
Figure 3:
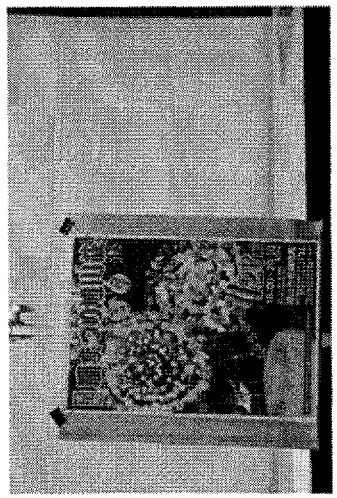
Figure 3:
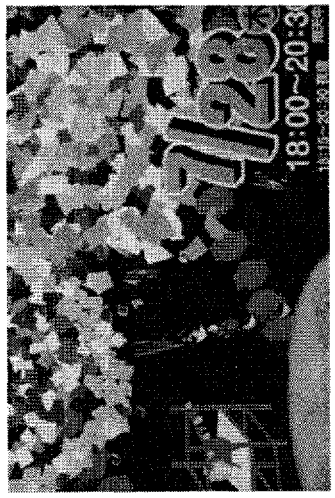
Figure 3:
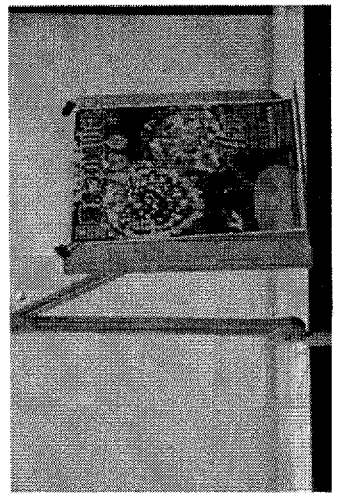

FIG. 3 shows examples of the shot images. As shown in FIG. 3, each sheet including the retrieval target was placed such that the entirety of the sheet could be shot, and then the sheet was shot to obtain a shot image while an angle θ of the optical axis of the camera with respect to the sheet was set at 90°, 75°, and 60°. In addition, a part of the sheet was shot, the angle θ being 90°. As a result, four shot images were obtained per one retrieval target. In addition, the sizes of the shot images were reduced to a size of 512×341 pixels to obtain query images, and feature vectors were obtained by PCA-SIFT. As a result, 612 query feature vectors were obtained on average per one query image.

<Determination of Threshold Value t>

First, experiments for examining an appropriate value to be set as the threshold value t of distance for the comparison using ANN, were conducted. Specifically, how the recognition rate varies by the value of t being varied was examined, for each of the compiled image databases. Table 2 shows a result of the experiment obtained when R was set at 50, where R is the maximum number of local features extracted per one reference image in each image database. From the result shown in Table 2, it is found that the recognition rate was high roughly when the threshold value t was set at 3873 and 3162. Also when the value of R was varied, in general, the recognition rate was high roughly when the threshold value t was set at 3873 and 3162. In view of the above result, the threshold value t was set at 3873 in the following experiments.

TABLE 2

Recognition rate with value of t being varied (R = 50)

| | Recognition rate [%] | | | | Processing |
|---|---|---|---|---|---|
| t | Average | 60° | 75° | 90° | Part | time [ms] |
| ∞ | 92.6 | 94.4 | 96.8 | 96.2 | 83.0 | 440.7 |
| 4472 | 92.8 | 94.4 | 96.8 | 96.4 | 83.4 | 454.4 |
| 3873 | 93.3 | 94.0 | 97.2 | 97.0 | 84.8 | 465.5 |
| 3162 | 93.2 | 93.0 | 97.6 | 96.8 | 85.2 | 450.8 |
| 2236 | 90.1 | 79.8 | 97.4 | 96.8 | 86.4 | 448.9 |

<Effectiveness of Sifting Selection of Features>

Next, the following four methods of (A), (B), (C), and (D) were compared. In the method (A), k-means clustering is performed and a feature vector having a long vector length is selected from each cluster. In the method (B), k-means clustering is performed in an image space, for each image, and local features are selected in a random manner from each cluster. In the method (C), some feature vectors having the largest vector lengths are selected from each image. In the method (D), local features are selected in a random manner from each image.

Figure 4:
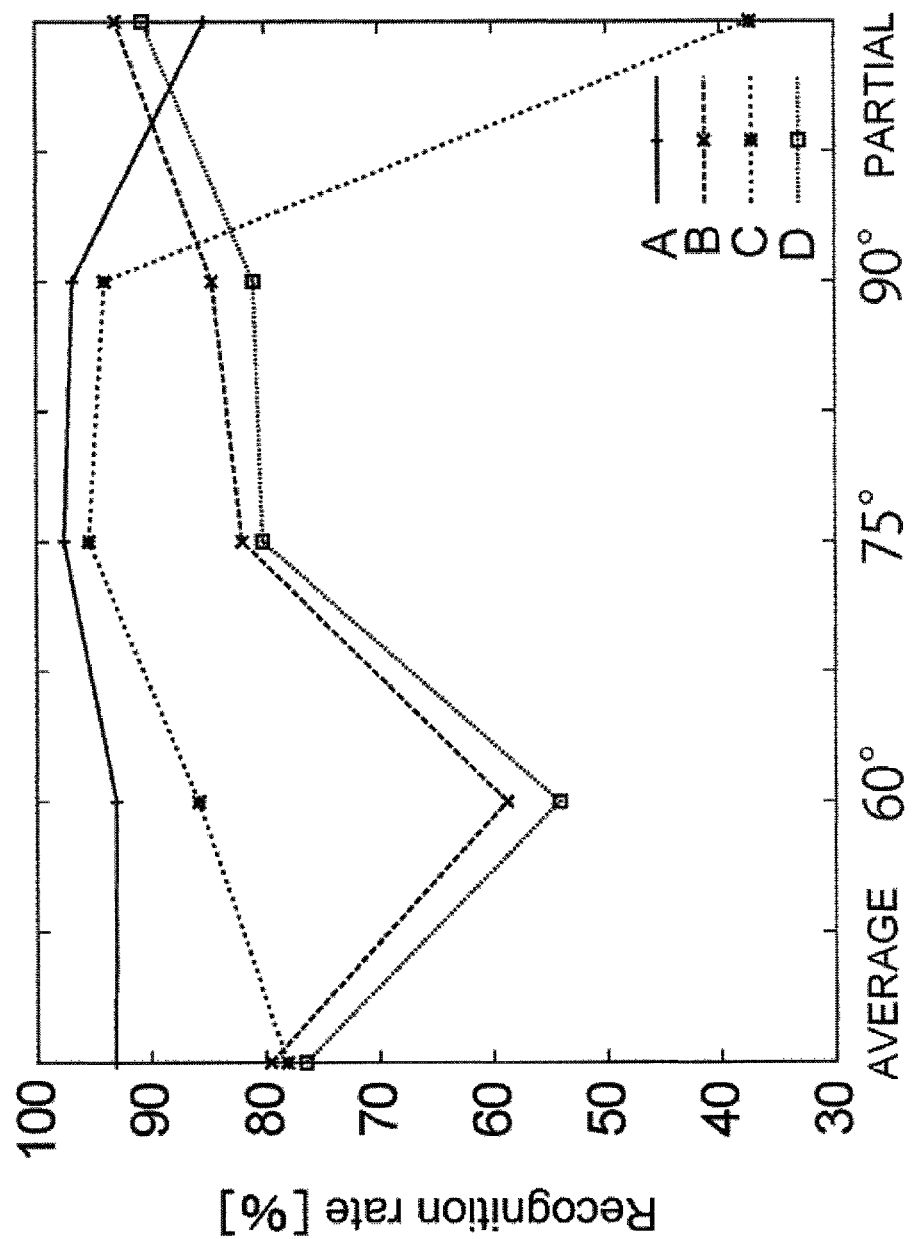
FIG. 4 is a graph showing a result of an experiment of the present invention. This graph shows recognition rates for query images shown in FIGS. 3(a) to 3(d), and an average recognition rate of the recognition rates.

In the above four methods, image databases were compiled by using the same value of R, and the recognition rates were compared to each other. The threshold value t of distance was set at 3873. FIG. 4 shows a result obtained when R was set at 50.

In FIG. 4, the value on the vertical axis indicates the recognition rate. On the horizontal axis, "average" at the left end indicates an average recognition rate of all recognition rates obtained in the following four conditions. "60°" indicates an average recognition rate for query images shot at a shooting angle of 60°, "75°" indicates an average recognition rate shot at a shooting angle of 75°, "90°" indicates an average recognition shot at a shooting angle of 90°, and "part" indicates an average recognition rate for query images obtained by shooting a part of a sheet. As shown in FIG. 4, in the case where the entirety of a sheet was shot, the method (A) had the highest recognition rate.

In comparison between the methods (A) and (C) in FIG. 4, in the case where an image including the entirety of a specific planar object is to be recognized, it can be said that it is advantageous to use feature vectors having long vector lengths, which have robust resistance to variation in the shooting angle.

However, in the case where feature vectors having long vector lengths were merely registered as in the method (C), if a query image including only a part of a retrieval target was used, the recognition rate significantly decreased. One of possible reasons for the decrease is that feature vectors having long vector lengths were mostly present outside a shooting range of a query image, and as a result, a query feature vector and a reference vector could not successfully be compared.

On the other hand, in the case where k-means clustering is used and local features are evenly selected from every portion of an image as in the method (A), the recognition rate was largely restored. Therefore, it can be said that it is important to evenly select feature vectors having long vector lengths from an image.

Table 3 shows the recognition rate obtained in the method (A) while the value of R is varied. ∞ indicates the case where the maximum number of local features to be registered into an image database was not restricted.

TABLE 3

| Recognition rate with value of R being varied (t = 3873) | | | | | | |
|---|---|---|---|---|---|---|
| No-reduction ratio [%] | Recognition rate [%] | | | | | Processing time [ms] |
| | Average | 60° | 75° | 90° | Part | |
| 100 | 98.7 | 97.8 | 99.0 | 99.0 | 99.0 | 1038 |
| 16.1 | 98.8 | 98.4 | 99.0 | 99.0 | 98.8 | 778.6 |
| 10.9 | 98.4 | 98.2 | 98.6 | 98.6 | 98.0 | 658.8 |
| 5.5 | 97.6 | 97.6 | 98.2 | 98.6 | 95.8 | 553.5 |
| 4.1 | 96.7 | 96.8 | 98.2 | 97.8 | 94.0 | 537.2 |
| 2.7 | 93.3 | 94.0 | 97.2 | 97.0 | 84.8 | 465.5 |

As shown in Table 3, even in the case where a memory amount for an image database was reduced to about 10% of the original memory amount, a recognition rate of 98% or more was realized. As the value of R decreased, a query image including a part of a sheet began to decrease, and the degree of the decrease gradually became large. It is considered that this is because feature vectors having long vector lengths were selected.

As shown in the above experiments, if sifting selection of local features was performed in consideration of the vector lengths of feature vectors and the uniformity of distribution of feature vectors in an image space, even in the case of using an image database having a size of about 1/10 of an image database that is in a no-reduction state, a recognition rate of 98% was obtained, whereby the effectiveness of the memory amount reduction method of the present invention was verified.

Various modifications of the present invention may be attained other than the above mentioned embodiment. Such modifications should not be deemed to be out of the scope of the present invention. The present invention should include all the modifications within the scope of the claims, their equivalents, and within the above scope.

Industrial Applicability

The present invention is highly effective for, when specific object recognition is to be performed for a large-scale image database including several tens of thousands of images or several hundreds of thousands of images by using local features obtained by SIFT (Scale-Invariant Feature Transform) or the like, compiling the image database.

In the case of using a large-scale image database for specific object recognition, the number of local features (feature vectors) to be stored in the image database is large. Therefore, a problem that a memory amount needs to be reduced arises. According to the present invention, by using modified method for sifting selection of local features, it becomes possible to save a memory amount needed for storing local features in an image database.

Description of the Reference Characters $p_1$, $p_2$, $p_3$, $p_4$, $p_5$, $p_6$ feature vector in image included in image database
q feature vector of query
r distance between vectors $p_1$ and q, i.e., radius

The invention claimed is:

1. A method of compiling an image database storing reference images to be compared with a query image and being used for specific object recognition, the method comprising:
an extracting step of extracting a plurality of reference feature vectors representing local features of different locations from a reference image to be stored into the image database, each reference feature vector having a vector length and a vector direction;
a clustering step of forming clusters, each cluster being composed of different feature vectors;
a selecting step of selecting a feature vector from each cluster as a representative vector of each cluster; and
a storing step of storing the representative vector into the image data base for specific object recognition in relation with the reference image, wherein:
the clustering step forms each cluster so that the reference feature vectors representing local features located closely within the reference image belong to the same cluster;
the selecting step gives a priority to any of the reference feature vectors each having a longest vector length when selecting the representative vector;
the comparison is made by generating a plurality of query feature vectors from the query image in the same manner as that of extracting the reference feature vector and adopting a near neighbor search between each of the query feature vectors and the representative vector of each cluster; and
each of the above steps is executed by a computer.

2. A method for compiling an image database according to claim 1, wherein:
the clustering step forms a predetermined number of clusters.

3. A method for compiling an image database according to claim 1, wherein:
the selecting step determines a sole representative vector from each cluster.

4. A method for compiling an image database according to claim 1, wherein:
the clustering step forms the clusters using k-means clustering.

5. An image retrieval method of retrieving from an image database storing previously a plurality of reference images to be compared with a query image and being used for an image retrieval of specific object recognition, each reference image being stored in conjunction with representative vectors extracted from each reference image, a particular reference image corresponding to the query image, the method comprising:
an extracting step of extracting a plurality of query feature vectors, each of the query feature vectors representing local feature of the query image and having a vector length and a vector direction;
a comparing step of making comparison between each of the query feature vectors and each of the representative vectors related to each reference image adopting a near neighbor search therebetween, wherein:
each of the representative vectors is obtained through a procedure of extracting a plurality of reference feature vectors from each reference image in the same manner as that of extracting the query feature vector; forming clusters, each cluster being composed of the reference feature vectors, so that the reference feature vectors representing local features located closely within the reference image belong to the same cluster; selecting each of the representative vectors from each cluster giving a priority to any of the reference feature vectors having a longest vector length when selecting the representative vector; and
each of the above steps is executed by a computer.

6. An image database compilation program stored on a non-transitory computer readable media, the program causing a computer to execute a compilation of an image database storing reference images to be made comparison with an query image and being used for specific object recognition, the program comprising:
- an extracting step of extracting a plurality of reference feature vectors representing local features of different locations from a reference image to be stored into the image database, each reference feature vector having a vector length and a vector direction;
- a clustering step of forming clusters, each cluster being composed of different feature vectors;
- a selecting step of selecting a feature vector from each cluster as a representative vector of each cluster; and
- a storing step of storing the representative vector into the image data base for specific object recognition in relation with the reference image, wherein:
- the clustering step forms each cluster so that the reference feature vectors representing local features located closely within the reference image belong to the same cluster;
- the selecting step gives a priority to any of the reference feature vectors having a longest vector length when selecting the representative vector; and
- the comparison is made by generating a plurality of query feature vectors from the query image in the same manner as that of extracting the reference feature vector and adopting a near neighbor search between each of the query feature vectors and the representative vector of each cluster.

* * * * *